United States Patent Office 3,538,096
Patented Nov. 3, 1970

---

3,538,096
PRODUCTION OF PROPYLENUREA ALDEHYDES
Harro Petersen, Frankenthal, Pfalz, Germany, assignor to Badische Anilin- & Soda-Fabrik Aktiengesellschaft, Ludwigshafen (Rhine), Germany
No Drawing. Filed Sept. 7, 1967, Ser. No. 665,971
Claims priority, application Germany, Sept. 15, 1966,
1,670,157
The portion of the term of the patent subsequent to Oct. 13, 1987, has been disclaimed
Int. Cl. C07d *51/18*
U.S. Cl. 260—251      3 Claims

---

ABSTRACT OF THE DISCLOSURE

Compounds of the formula

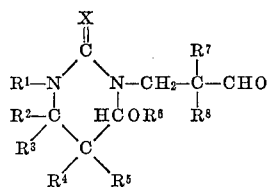

wherein X is oxygen or sulfur, $R^2$ through $R^8$ are alkyl radicals, and $R^2$ through $R^6$ may also be hydrogen, $R^1$ is hydrogen, alkyl or alkylaldehyde are prepared by reacting the corresponding 3-methyloxy derivative with an aldehyde, e.g., isobutyraldehyde, in the presence of a strong acid. The products are useful as textile treating agents.

---

This invention relates to the production of propylenurea aldehydes bearing oxygen or sulfur as a substituent in the 2-position, an alkylaldehyde group as a substituent in the 3-position, a hydroxy group or alkoxy group as a substituent in the 4-position, and optionally other substituents in positions 1, 5 and 6, and to the new substances thus obtained.

It is an object of this invention to provide a process for the production of propylenurea aldehydes bearing oxygen or sulfur as a substituent in the 2-position, an alkylaldehyde group as a substituent in the 3-position, a hydroxy group or alkoxy group as a substituent in the 4-position and optionally other substituents in positions 1, 5 and 6, in good yields and in a simple way. Another object of this invention is to provide new propylenurea aldehydes containing oxygen or sulfur in the 2-position, an alkylaldehyde group in the 3-position, a hydroxy group or alkoxy group in the 4-position, a hydrogen atom, alkyl group or alkyl aldehyde group in the 1-position and optionally alkyl groups in positions 5 and/or 6.

In accordance with this invention these and other objects are achieved and propylenurea aldehydes having the general formula:

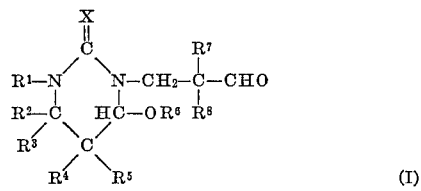

(in which $R^2$, $R^3$, $R^4$, $R^5$ and $R^6$ may be identical or different and denote hydrogen atoms or alkyl radicals, $R^7$ and $R^8$ denote identical or different alkyl radicals, X denotes an oxygen atom or a sulfur atom, and $R^1$ denotes a hydrogen atom, an alkyl group or the radical:

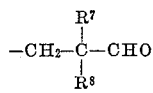

in which $R^7$ and $R^8$ have the above meanings) are obtained in very good yields and in a simple way by reacting a propylenurea having the general formula:

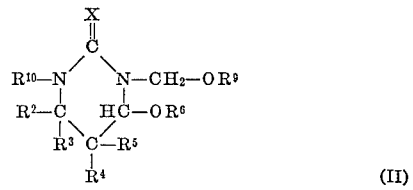

(in which the radicals $R^2$, $R^3$, $R^4$, $R^5$, $R^6$ and X have the above meanings, $R^9$ denotes a hydrogen atom or, when $R^6$ denotes an alkyl group, $R^9$ denotes the same alkyl group, $R^{10}$ denotes a hydrogen atom, an alkyl group or the radical —$CH_2$—$OR^9$) with a CH-acid aldehyde having the general formula:

(in which $R^7$ and $R^8$ have the above meanings) in the presence of an acid and in the presence or absence of an inlet solvent and/or diluent, at a temperature of from 0° to 120° C., using for each —$OR^9$ group of the starting urea about the stoichiometric amount of the CH-acid aldehyde. The process is advantageously carried out in the temperature range from 40° to 100° C.

In the preferred starting materials, the radicals $R^2$, $R^3$, $R^4$ and $R^5$ denote hydrogen atoms or identical or different alkyl radicals having one to seven carbon atoms, $R^6$ denotes a hydrogen atom or an alkyl radical preferably having one to ten carbon atoms, $R^7$ and $R^8$ denote alkyl radicals preferably having one to four carbon atoms and X denotes an oxygen atom or a sulfur atom, the radical $R^9$ may be a hydrogen atom or, when $R^6$ denotes an alkyl group, $R^9$ denotes the same alkyl group, the radical $R^{10}$ may be a hydrogen atom, an alkyl radical having one to seventeen carbon atoms or the radical —$CH_2$—$OR^9$ in which $R^9$ has the above meaning.

The process may be represented for example for the reaction of 1,5,5-trimethyl-4-methoxy-3-methoxymethylpropylenurea with isobutyraldehyde by the following equation:

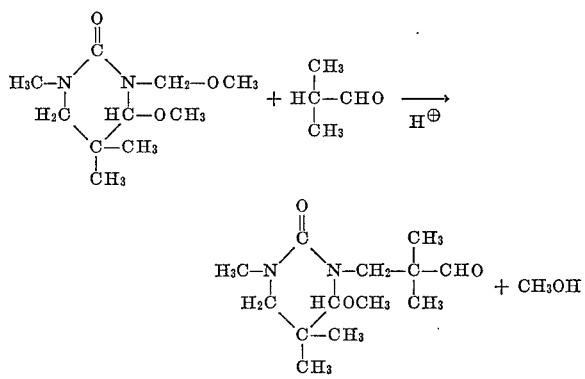

The propylenurea (II) may be prepared very simply, for example by condensation of a urea with formaldehyde and a CH-acid aldehyde in the molar ratio of about 1:1:1 or by condensation of a urea with a CH-acid aldehyde in the molar ratio of about 1:2 in the presence of a strong acid and if desired in the presence of an alkanol in the temperature range of from 30° to 100° C. followed by reaction of the resultant 4-hydroxypropylene(thio)urea or 4-alkoxypropylene(thio)urea with formaldehyde, if desired in the presence of an alkanol.

Examples of suitable propylenureas having the Formula

II are: N,N'-dimethylol-4-hydroxy-5,5-dimethylpropylenurea, N,N' - dimethylol-4-hydroxy-5,5-dimethyl-6-isopropylenurea, N-methyl-N'-methylol-4-hydroxy-5,5-dimethylpropylenurea, N-monomethylol-4-hydroxy-5,5-dimethyl-6-isopropylenurea, N,N'-dimethylol-4-methoxy-5,5-dimethylpropylenurea, N,N'-dimethoxymethyl-4-methoxy-5,5-dimethylpropylenurea and the corresponding methylol and alkoxymethyl compounds of 4-hydroxypropylenethioureas and 4-alkoxypropylenethioureas.

Isobutyraldehyde is a particularly suitable CH-acid aldehyde; other suitable compounds are 2-methylpentanal and 2-ethylhexanal.

Strong acids which do not oxidize under the reaction conditions, for example hydrogen chloride, sulfuric acid, sulfonated ion exchangers, oxalic acid, p-toluenesulfonic acid or benzenesulfonic acid, are particularly suitable as acids. They are used as a rule in amounts of 2 to 30% by weight, based on the urea to be reacted.

In carrying out the process it is not necessary to start from pure propylenurea according to Formula II. Rather it is possible to make direct use of the reaction mixture obtained by reaction of the 4-hydroxypropylenurea, 4-hydroxypropylenethiourea, 4-alkoxypropylenurea or 4-alkoxypropylenethiourea with formaldehyde. Direct use may also, be made of the reaction mixture obtained by reaction of the 4-hydroxypropylenurea, 4-hydroxypropylenethiourea, 4-alkoxypropylenurea or 4-alkoxypropylenethiourea with formaldehyde in the presence of an alkanol.

It is advantageous to carry out the reaction in the presence of an inert solvent and/or diluent, such as water or dioxane. The solvent and/or diluent may be used alone or as mixtures. They are used as a rule in amounts of from 10 to 500% by weight with reference to the urea to be reacted.

The reaction of the substances in general takes place in the theoretical molar ratio. Slight deviations from this molar ratio, for example of up to 10 mole percent, are however possible.

The process according to this invention is a condensation reaction which can be accelerated by adding more acid, with or without an increase in the reaction temperature. In many cases it is possible to obtain the appropriate propylenureas and propylenethioureas even at low temperatures in the presence of a large amount of acid. On the other hand it is possible to carry out the reaction at higher temperatures in the presence of less acid. The choice of temperature depends on the reactants used and may be lowered by increasing the amount of acid added and vice versa.

The new compounds which can be prepared by this method are textile finishing agents and valuable intermediates, for example for the production of textile finishing agents and aminoplasts. They may for example be used to finish cloth by impregnating it with 80 to 200 grams per kilogram of fibrous material from aqueous suspension and drying and treating it at elevated temperature, for example at 100° to 160° C., in a condensation unit.

The invention is illustrated by the following examples in which parts are by weight.

EXAMPLE 1

60 parts of 50% by weight aqueous sulfuric acid is added to 492 parts of N,N'-dimethoxymethyl-4-methoxy-5,5-dimethylpropylenurea and 288 parts of isobutyraldehyde in a stirred apparatus having a reflux condenser, the temperature rising to about 60° C. The reaction solution is heated for five hours at refluxing temperature while stirring, the refluxing temperature rising in the course of the first three hours from 70° to about 85° C. When reaction is over, the whole is neutralized with caustic soda solution and the reaction product is extracted with chloroform. The chloroform solution is dried with sodium sulfate, filtered and the chloroform evaporated. 634 parts of a viscous crude product is obtained, i.e. a yield of 97% of the theory. Purification is effected by distillation in a high vacuum. The 4-methoxy-5,5-dimethylpropylenurea-N,N'-dineopental obtained has a boiling range of from 175° to 188° C. at a pressure of 0.5 mm. The product begins to crystallize after some days.

Analysis. — Calculated for $C_{17}H_{30}O_4N_2$ (percent) (326): C, 62.6; H, 9.2; O, 19.6; N, 8.6. Found (percent): C, 62.4; H, 9.4; O, 19.6; N, 8.9.

EXAMPLE 2

50 parts of concentrated hydrochloric acid is added in a stirred apparatus with a reflux condenser to a mixture of 288 parts of N,N'-dimethoxymethyl-4-methoxy-5,5-dimethyl-6-isopropylpropylenurea and 144 parts of isobutyraldehyde in 100 parts of dioxane, and the whole heated at refluxing temperature for four hours. The refluxing temperature rises during the first two hours from about 75° to about 85° to 90° C. The reaction mixture is neutralized with caustic soda solution and extracted with chloroform, the chloroform solution is dried with sodium sulfate and filtered and the filtrate is evaporated in a water jet vacuum. 320 parts of 4-methoxy-5,5-dimethyl-6-isopropylpropylenurea-N,N'-dineopental is obtained as a crude product. It may be purified by fractional high vacuum distillation. The product has a boiling range of from 205° to 220° C. at a pressure of 0.5 mm.

Analysis. — Calculated for $C_{20}H_{36}O_4N_2$ (percent) (368): C, 65.2; H, 8.8; O, 17.4; N, 7.6. Found (percent): C, 65.0; H, 8.9; O, 17.0; N, 7.5.

I claim:

1. A process for the production of propylenurea aldehydes having the formula

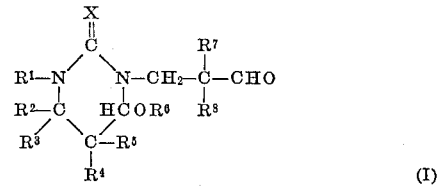

(I)

in which $R^2$, $R^3$, $R^4$, $R^5$ may be identical or different and denote hydrogen or alkyl of 1 to 7 carbon atoms, $R^6$ is hydrogen or alkyl of 1 to 10 carbon atoms, $R^7$ and $R^8$ denote identical or different alkyls of 1 to 4 carbon atoms, X denotes oxygen or sulfur, and $R^1$ is hydrogen, alkyl of 1 to 17 carbon atoms or the radical:

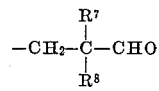

in which $R^7$ and $R^8$ have the above meaning wherein a propylenurea having the formula:

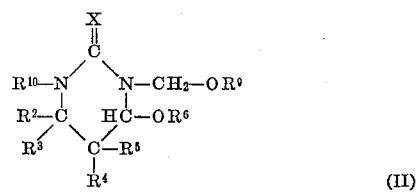

(II)

in which $R^2$, $R^3$, $R^4$, $R^5$, $R^6$ and X have the above meanings, $R^9$ denotes hydrogen or, when $R^6$ denotes an alkyl, $R^9$ denotes the same alkyl, and $R^{10}$ denotes hydrogen, an alkyl of 1 to 17 carbon atoms or the radical —$CH_2$—$OR^9$ is reacted with a CH-acid aldehyde having the formula:

(III)

in which $R^7$ and $R^8$ have the above meanings in the presence of a strong acid which does not oxidize under the reaction conditions, in the amount of 2 to 30% by weight based on the weight of the urea to be reacted and at a temperature of from 0° to 120° C., using about the stoichiometric amount of the CH-acid aldehyde for each —OR⁹ group.

2. A process as claimed in claim 1 carried out at a temperature of from 40° to 100° C.

3. A process as in claim 1 wherein said process is carried out in the presence of an inert solvent selected from the group consisting of water and dioxane.

References Cited

UNITED STATES PATENTS

| | | | |
|---|---|---|---|
| 2,957,028 | 10/1960 | Brannock | 260—601 |
| 3,335,187 | 8/1967 | Hargis et al. | 260—601 |

FOREIGN PATENTS

| | | |
|---|---|---|
| 655,066 | 1/1963 | Canada. |

OTHER REFERENCES

Blicke: Organic Reactions, vol. I, Wiley Press, 1942, pp. 306, 327, 332.

ALEX MAZEL, Primary Examiner

R. V. RUSH, Assistant Examiner

U.S. Cl. X.R.

252—8.8